(12) United States Patent
Liu et al.

(10) Patent No.: US 7,256,989 B2
(45) Date of Patent: Aug. 14, 2007

(54) REMOVABLE HARD DISK HOUSING ASSEMBLY

(75) Inventors: Kuo-Kuang Liu, Caotun Township, Nantou County (TW); Yu-Chen Chu, Dali (TW)

(73) Assignee: Universal Scientific Industrial Co., Ltd., Nan-Tou (TW)

( * ) Notice: Subject to any disclaimer, the term of this patent is extended or adjusted under 35 U.S.C. 154(b) by 53 days.

(21) Appl. No.: 11/329,166

(22) Filed: Jan. 11, 2006

(65) Prior Publication Data

US 2007/0159786 A1     Jul. 12, 2007

(51) Int. Cl.
*H05K 7/20* (2006.01)

(52) U.S. Cl. .................. 361/685; 312/223.1; 700/216; 714/763

(58) Field of Classification Search .. 312/223.1–223.6; 714/763; 700/216, 240; 361/679–687, 724–727
See application file for complete search history.

(56) References Cited

U.S. PATENT DOCUMENTS 6,459,572 B1 * 10/2002 Huang et al. ............... 361/685
6,490,153 B1 * 12/2002 Casebolt et al. ............ 361/685
6,891,723 B1 *  5/2005 Lin et al. .................... 361/685
7,057,890 B2 *  6/2006 Chang ......................... 361/684

\* cited by examiner

*Primary Examiner*—Hung Van Duong
(74) *Attorney, Agent, or Firm*—Rosenberg, Klein & Lee (57) ABSTRACT

The removable hard disk housing assembly includes a housing substrate, a hard disk supporting frame, a rotatable handle, a supporting piece, two plates-liked elements and two springs. The hard disk supporting frame is connected with the housing substrate to support a hard disk. The rotatable handle is positioned at the front side of the housing substrate. The supporting piece is rotatably positioned at the housing substrate. The plates-liked elements are movably positioned within the housing substrate and are pulled by supporting piece and protrude and retract in respond to movement of the supporting piece. Two springs are positioned between the plate-liked elements and the housing substrate and are used to bias the plate-liked elements. It prevents the hard disk from falling off when the assembly is subjected to external forces. The assembly is fixed by two extension portions so that force used to fix the assembly is well distributed.

11 Claims, 8 Drawing Sheets

REMOVABLE HARD DISK HOUSING ASSEMBLY

BACKGROUND OF THE INVENTION

1. Field of the Invention

The present invention relates to a removable hard disk housing assembly, and in particular to a hard disk housing assembly that is suited to desktop computers, servers and storage servers and is easy to remove.

2. Description of Related Art

Electronic appliances such as conventional desktop computers, servers and storage servers usually include hard disks used to store the required data. The hard disks are usually installed at hard disk cradles of the electronic appliances.

There is a conventional removable hard disk housing which has a bezel assembled on its front surface. A rotatable and adjustable handle is positioned at the bezel of the removable hard disk housing (hard disk tray), and a hook is positioned at the handle and used to hook a pin of the bezel. Thus, the handle is secured to touch a power switch when the handle is in folded state.

However, there is no effective mechanism in the conventional hard disk tray to secure the hard disk in so that the hard disk tray is easily to fall off when the hard disk tray is subjected to impact during delivery. Thus, the hard disk may be damaged.

In addition, the hook is usually positioned at one side of the hard disk tray so that force used to secure the hard disk cannot be equally distributed. It is likely for the hard disk to be rotated when the hard disk tray is subjected to external force. Thus, connectors of the hard disk may be damaged or quality of data transfer of the hard disk is not good.

SUMMARY OF THE INVENTION

It is an object of the present invention to provide a removable hard disk housing assembly. A hard disk is secured to the removable hard disk housing assembly without screws and additional tools. It prevents the hard disk housing assembly from falling off when the hard disk housing assembly is subjected to external force. The present invention holds two sides of the removable hard disk housing assembly so that force used to secure the hard disk is equally distributed. The present invention does not only hold the removable hard disk housing assembly but also protects the connector of the hard disk. Data destruction will not happen.

To achieve the object, the present invention provides a removable hard disk housing assembly including a housing substrate, a hard disk supporting frame, a rotatable handle, a supporting piece, two plates-liked elements and two springs. The hard disk supporting frame is connected with the rear side of the housing substrate to support a hard disk. The rotatable handle is positioned at the front side of the housing substrate. The supporting piece is secured with the rotatable handle and rotatably positioned at the housing substrate. The plates-liked elements are movably positioned within the housing substrate, and two plate-liked elements correspond with the supporting piece. The plate-liked elements protrude and retract in respond to movement of the supporting piece. Two springs are positioned between the plate-liked elements and the housing substrate and are used to bias the plate-liked elements toward the reverse direction.

BRIEF DESCRIPTION OF THE DRAWINGS

The present invention can be fully understood from the following detailed description and preferred embodiment with reference to the accompanying drawings, in which.

DETAILED DESCRIPTION OF THE PREFERRED EMBODIMENTS

The following detailed description is of the best presently contemplated modes of carrying out the invention. This description is not to be taken in a limiting sense, and is made merely for the purpose of illustrating general principles of embodiments of the invention. The scope of the invention is best defined by the appended claims.

Reference is made to FIGS. 1-5. The present invention provides a removable hard disk housing assembly 1 used to accommodate a hard disk 2 so that the hard disk 2 can be installed at electronic appliances. The removable hard disk housing assembly 1 includes a housing substrate 11, a hard disk supporting frame 12, a rotatable handle 13, a supporting piece 14, a handle spring 15, two plate-liked elements 16 and two compressive springs 17. The housing substrate 11 is substantially hollow and box-liked and has a plurality of heat-dissipating holes 111. The heat-dissipating holes 111 pass through the housing substrate 11 from a front side to a rear side thereof and provide air-convection for dissipating heat away from the hard disk 2. A receiving space 112 is formed at the front side of the housing substrate 11 and has a surface 113 formed with a through hole 114 at its center. Two fixing holes 115 are positioned in the vicinity of the through hole 114 and in communication with the through hole 114. Two corresponding recesses 116 are positioned at in the vicinity of the receiving space 112 and are used to receive the rotatable handle 13. A stop plate 117 is positioned at the backside of the housing substrate 11 and is substantially U-shaped to cover the top, the bottom and the backside of the housing substrate 11. In addition, a plurality of heat-dissipating holes 118 are positioned at the stop plate 117 to aid heat transfer by airflow.

Figure 1:
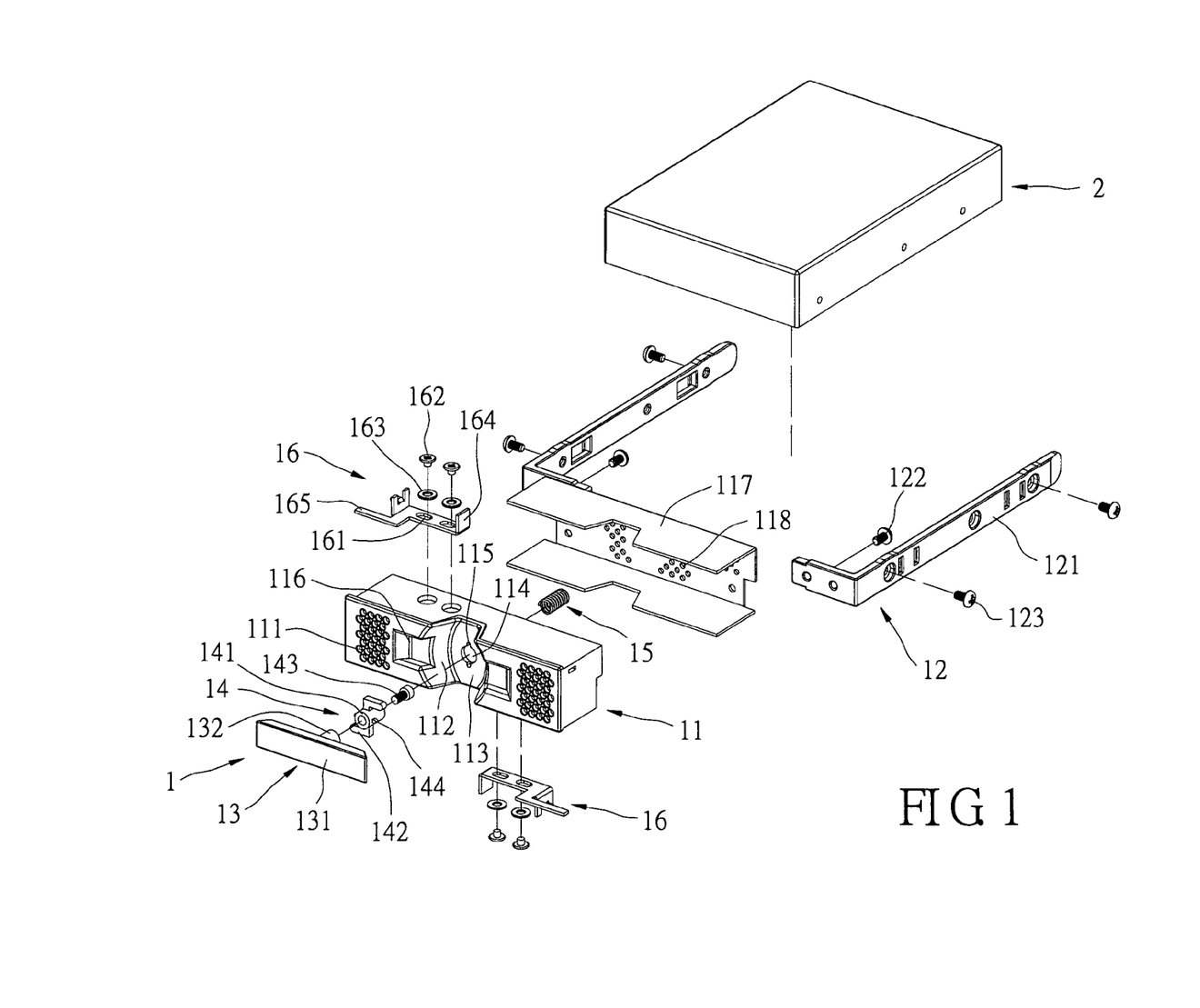
FIG. 1 is an exploded perspective view of a removable hard disk housing assembly in accordance with the present invention.
Figure 2:
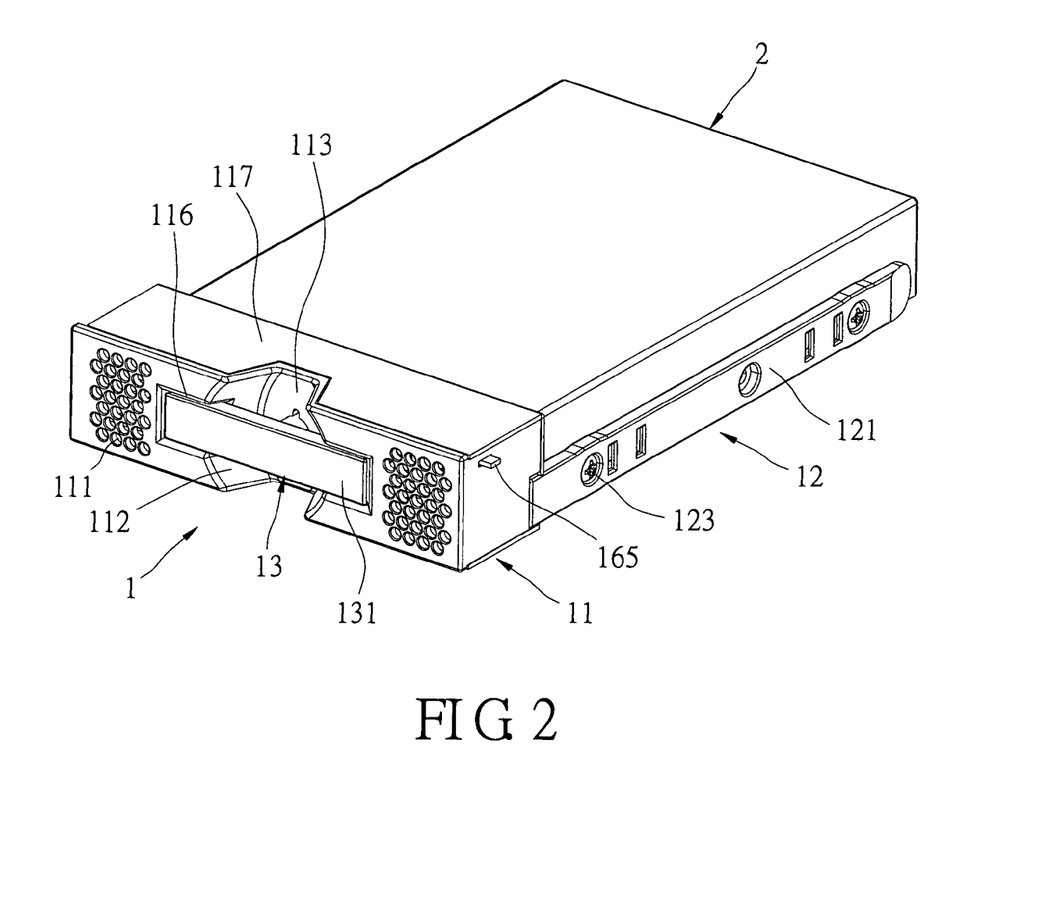
FIG. 2 is a perspective view of a removable hard disk housing assembly in accordance with the present invention.

The hard disk supporting frame 12 is positioned at the backside of the housing substrate 11 to support and hold the hard disk 2. In this embodiment, the hard disk supporting frame 12 includes two side frames 121 which are symmetrical and L-shaped. However, the shape of the hard disk supporting frame 12 is not limited to this.

The side frames 121 are respectively connected to the stop plate 117 of the housing substrate 11 by connection pieces (such as screws) so that the hard disk supporting frame 12 can be connected to the backside of the housing substrate 11. The hard disk 2 is placed between the side frames 121 and is fixed to the side frames 121 by a plurality of fixing pieces (such as screws) 123. Thus, the hard disk 2 is fixed at the removable hard disk housing assembly 1.

The rotatable handle 13 is positioned at the front side of the housing substrate 11 and is substantially T-shaped. The rotatable handle 13 has a handgrip 131 and an axial portion 132 integrally formed at a rear central portion of the handgrip 131. The axial portion 132 is substantially perpendicular to the handgrip 131.

The supporting piece 14 is positioned behind the rotatable handle 13 and has a fixing tube 141 and two tabs 144 respectively protruding from the fixing tube 141. The fixing tube 141 is connected to a rear end of the axial portion 132 of the rotatable handle 13 by a connection piece (such as screw) 143. Two tabs 144 of the fixing tube 141 respectively correspond with to two fixing hole 115, and outer diameter of the fixing tube 141 is slightly smaller than inner diameter of the through hole 114. Because the through hole 114 is adapted to receive the fixing tube 141 of the supporting piece 14, the rotatable handle 13 is rotatably positioned at the housing substrate 11.

The handle spring 15 is positioned within the housing substrate 11 and between the supporting piece 14 and the stop plate 117 of the housing substrate 11 to abut against the supporting piece 14, therefore it can provide force for the forward displacement of the supporting piece 14 and the rotatable handle 13.

The two plate-liked elements 16 are positioned within the housing substrate 11 and respectively have two guide slots 161. Each plate-liked element 16 is positioned at the housing substrate 11 because two fixing pieces 162 (such as screws) pass through a washer 163 and the guide slots 161. The fixing pieces 162 and the guide slots 161 can guide the plate-liked element 16 so that the plate-liked element 16 can be moved along a transversal direction (perpendicular to the axial portion 132 of the rotatable handle 13). Thus, the supporting piece 14 can alternatively push or withdraw the plate-liked elements 16. Each of the plate-liked elements 16 forms a push portion 164 and an extension portion 165 at two ends, respectively. The push portion 164 is extended from the plate-liked element 16 and is uprightly bend. The extension portion 165 is also extended from the plate-liked element 16. In addition, the push portion 164 of each of the plate-liked elements 16 corresponds with an extension portion 142 of each of the supporting pieces 14.

Figure 5:
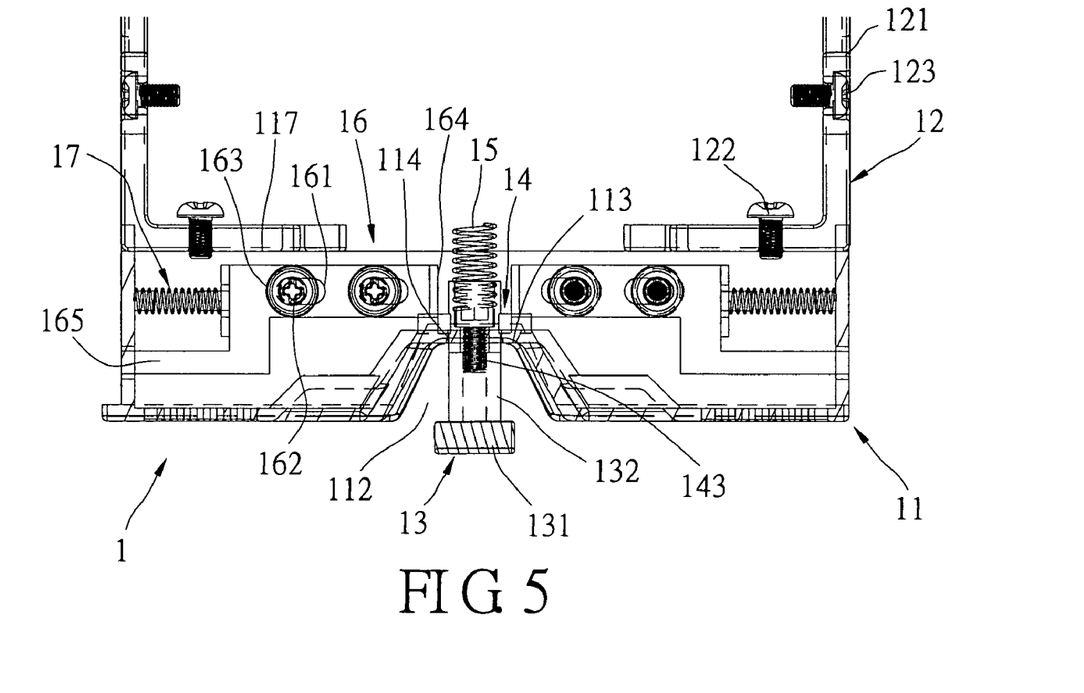
FIG. 5 is a top plan view of two plate-liked elements of the present invention when the plate-liked elements are in the compressed status.

The two compressive springs 17 are respectively positioned between the plate-liked elements 16 and two ends of the housing substrate 11 and are used to push against the plate-liked elements 16 and the housing substrate 11 (as shown in FIG. 5). Thus, the two compressive springs 17 can respectively push the plate-liked elements 16 to move inwardly. Through the above-mentioned structure, the removable hard disk housing assembly of the present invention is accomplished.

Figure 3:
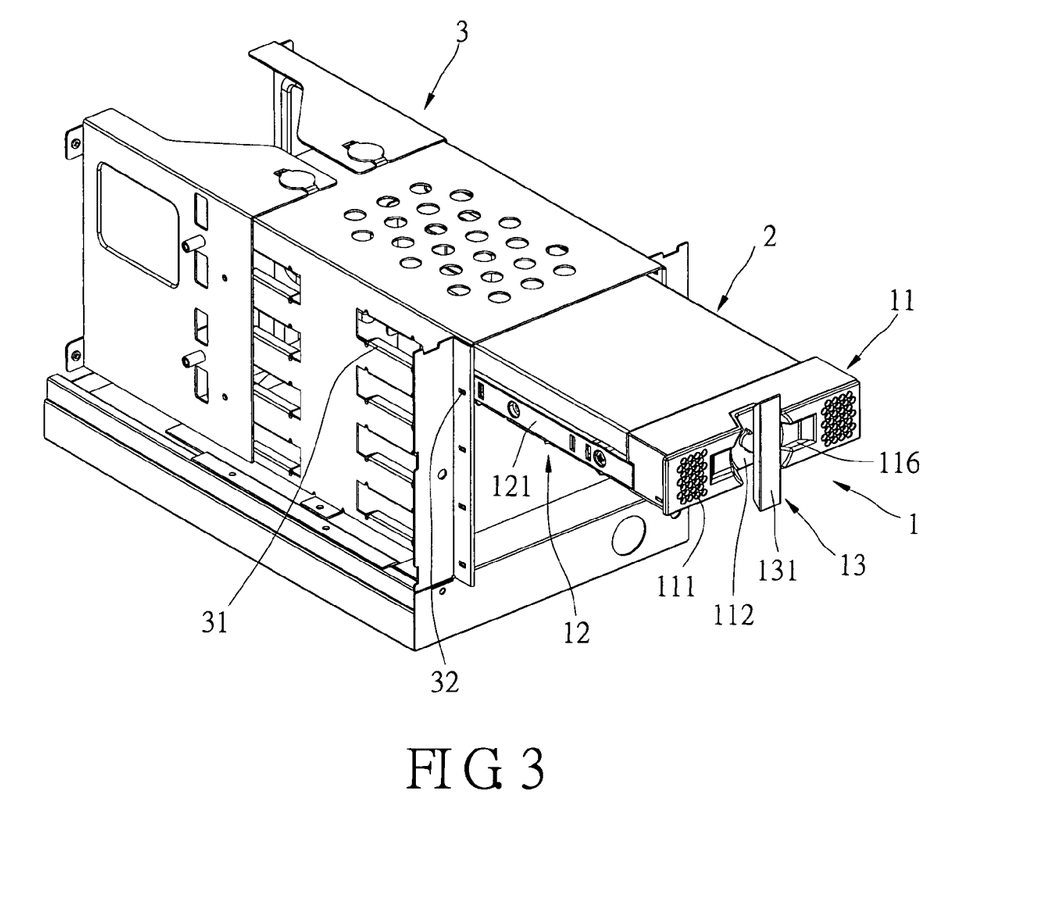
FIG. 3 is a perspective view showing how the removable hard disk housing assembly of the present invention is going to be inserted into a computer case.
Figure 4:
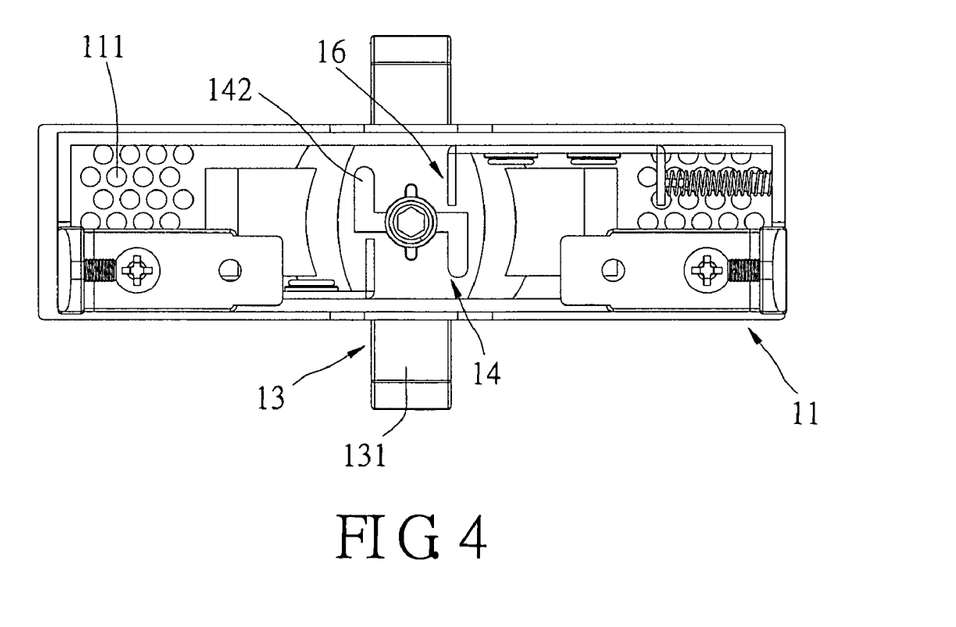
FIG. 4 is a rear view of two plate-liked elements of the present invention when the plate-liked elements are in the compressed status.
Figure 6:
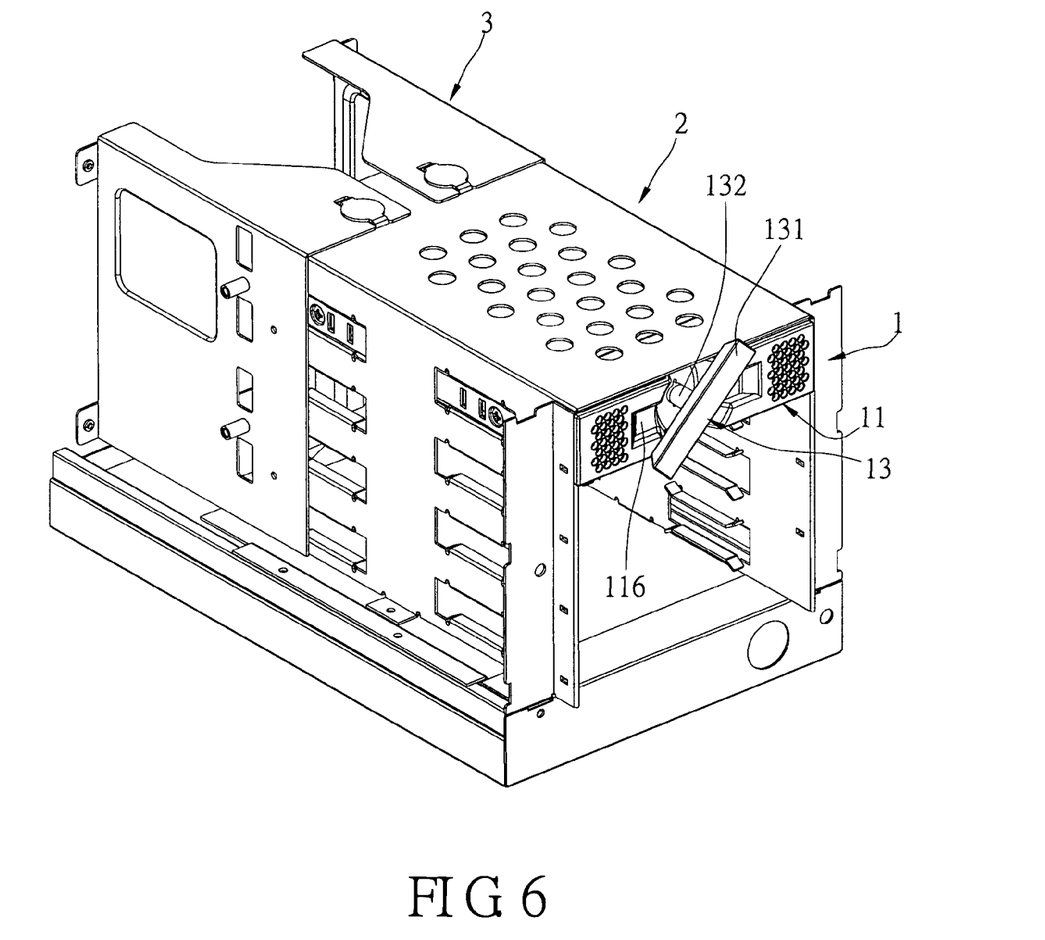
FIG. 6 is a perspective view showing the removable hard disk housing assembly of the present invention is completely inserted into a computer case.
Figure 7:
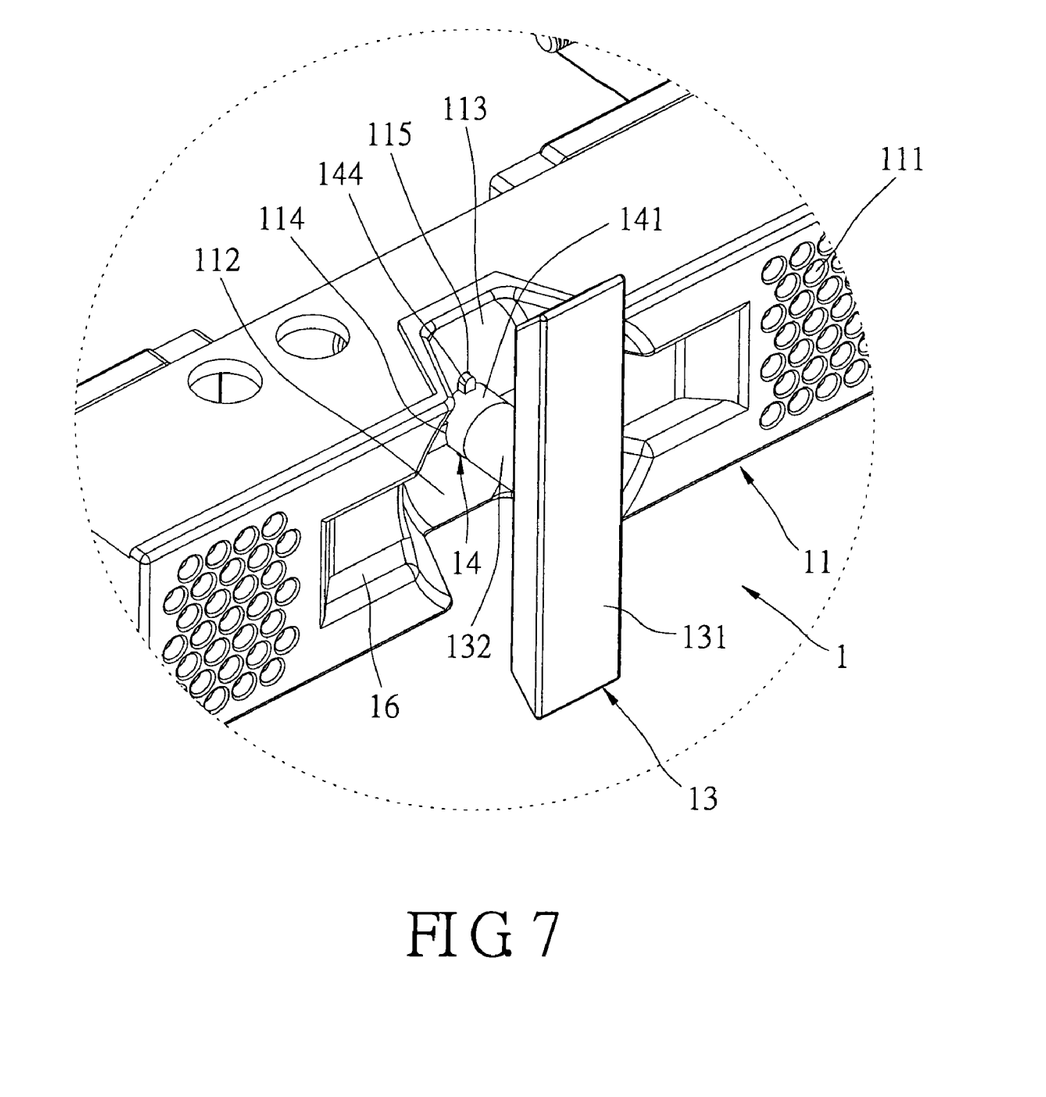
FIG. 7 is a partially enlarged view of the removable hard disk housing assembly of FIG. 3.
Figure 8:
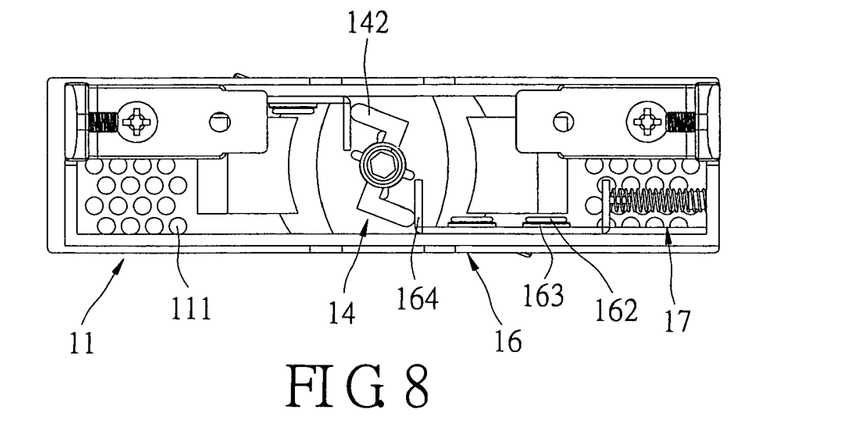
FIG. 8 is a rear view showing that the pin begins to push the plate-liked elements in accordance with the present invention.
Figure 9:
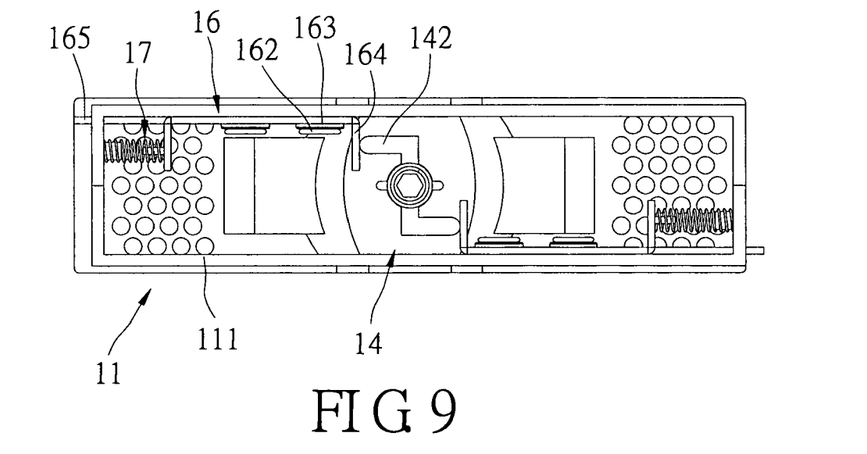
FIG. 9 is a rear view showing that end of the pin protrudes out of the housing substrate in accordance with the present invention.
Figure 10:
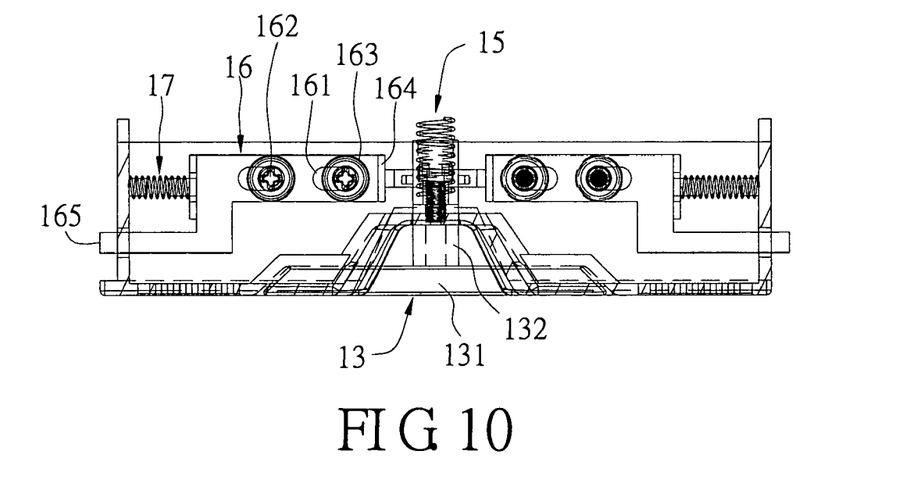
FIG. 10 is a top plan view showing that the pin is pushed and in protruded status in accordance with the present invention.
Figure 11:
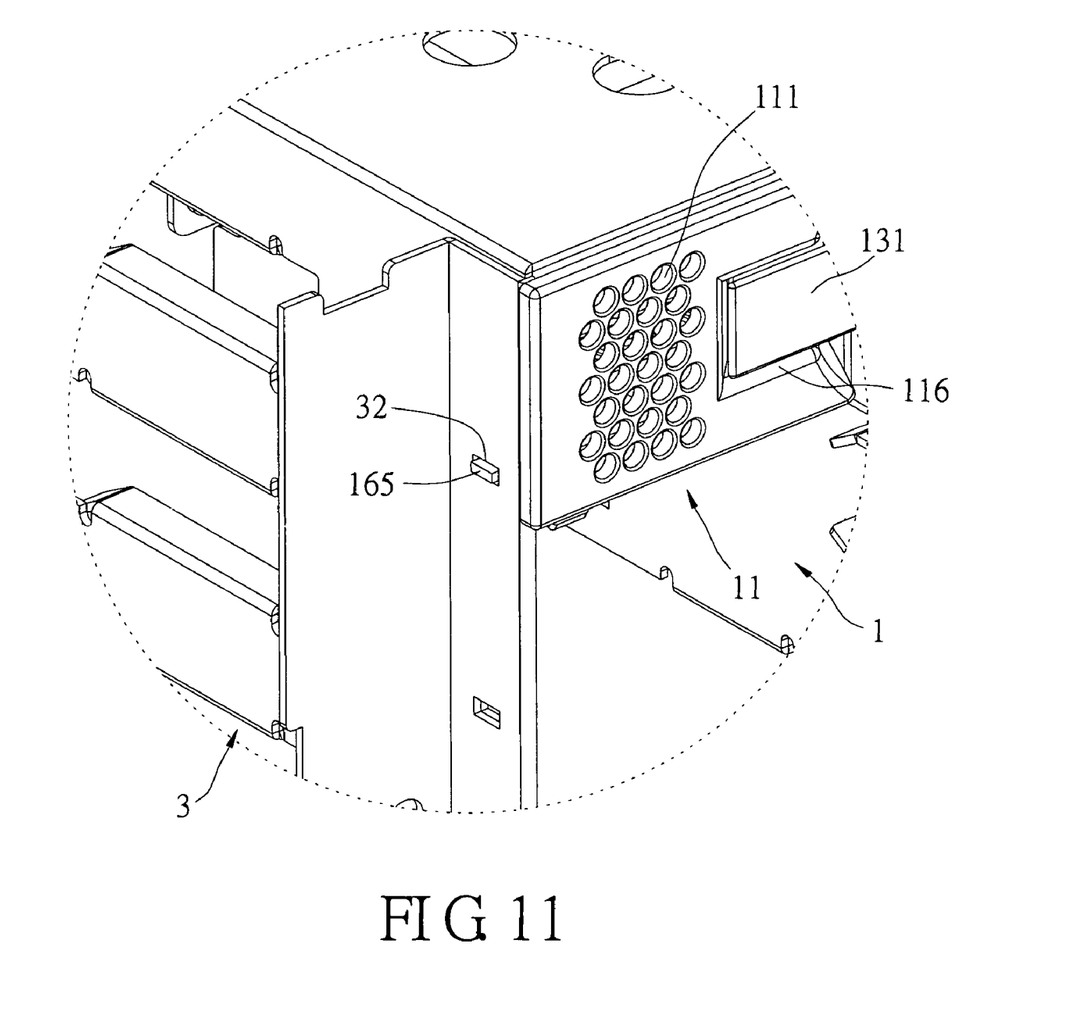
FIG. 11 is a partially enlarged view of the removable hard disk housing assembly of FIG. 10.

As shown in FIG. 3, the removable hard disk housing assembly 1 is positioned within a computer case 3 by sliding along a sliding groove 31, while the plate-liked elements 16 are at a withdrew condition, as shown in FIGS. 4 and 5 (Via the two compressive springs 17 and two extension portions 142 of the supporting pieces 14). When the removable hard disk housing assembly 1 slides inward until a predetermined position of the computer case 3 (as shown in FIGS. 6 and 7), the rotatable handle 13 is pushed inwardly. Therefore, the two tabs 144 of the supporting pieces 14 travel through the two fixing holes 115 and the two tabs 144 of the supporting pieces 14 are temporarily positioned within the housing substrate 11. The rotatable handle 13 is rotated clockwise so that the two extension portions 142 of the supporting pieces 14 respectively push the push portion 164 of the plate-liked elements 16, as shown in FIG. 8. The plate-liked elements 16 are respectively pushed and moved in opposite directions, and the handgrip 131 of the rotatable handle 13 is adapted to be received within the corresponding recesses 116. When the plate-liked elements 16 are pushed to the predetermined-end positions, ends of the extension portion 165 of the plate-liked elements 16 will protrude out of the housing substrate 11 as shown in FIGS. 9 and 10. In addition, the ends of the extension portion 165 of the plate-liked elements 16 are respectively inserted into two holes 32 of the computer case 3 so that the removable hard disk housing assembly is fixed at the computer case 3, as shown in FIG. 11.

According to the present invention, the removable hard disk housing assembly 1 is positioned at the computer case 3 without screws and additional tools and by inserting the ends of the extension portion 165 of the plate-liked elements 16 into the two holes 32 of the computer case 3. It prevents the removable hard disk housing assembly 1 from falling off when the removable hard disk housing assembly 1 is subjected to external forces. Bedsides, the removable hard disk housing assembly 1 is fixed at the computer case 3 by two extension portions 165 and the two holes 32 so that force used to fix the removable hard disk housing assembly 1 is well distributed. It also prevents the connectors and data stored at the hard disk from damaged.

While the invention has been described with reference to the preferred embodiments, the description is not intended to be construed in a limiting sense. It is therefore contemplated that the appended claims will cover any such modifications or embodiments as may fall within the scope of the invention defined by the following claims and their equivalents.

What is claimed is:

1. A removable hard disk housing assembly used to accommodate a hard disk, comprising:
   a housing substrate;
   a hard disk supporting frame, positioned at the backside of the housing substrate to support and hold the hard disk;
   a rotatable handle, positioned at the front side of the housing substrate;
   a supporting piece, positioned behind the rotatable handle and rotatably positioned at the housing substrate;
   two plate-liked elements, positioned within the housing substrate and respectively having two guide slots, and protruding and retracting because of the supporting piece; and two compressive springs, respectively positioned between the plate-liked elements and the housing substrate and used to bias against the plate-liked elements.

2. The removable hard disk housing assembly as claimed in claim 1, wherein the housing substrate has a plurality of heat-dissipating holes.

3. The removable hard disk housing assembly as claimed in claim 1, wherein a receiving space is formed at the front side of the housing substrate and has a surface having a through hole at its center, and at least one fixing hole are positioned in the vicinity of the through hole and two tabs of the fixing tube respectively correspond with two fixing holes, and the through hole is adapted to receive the fixing tube of the supporting piece.

4. The removable hard disk housing assembly as claimed in claim 1, wherein a stop plate is positioned at the backside of the housing substrate and a plurality of heat-dissipating holes are positioned at the stop plate, and the hard disk supporting frame can be connected to the backside of the housing substrate by connection pieces.

5. The removable hard disk housing assembly as claimed in claim 4, wherein a handle spring is positioned within the housing substrate and is used to bias the supporting piece and the rotatable handle forwardly.

6. The removable hard disk housing assembly as claimed in claim 1, wherein the hard disk supporting frame includes two side frames, and the hard disk is positioned between the two side frames so that the hard disk is fixed at the two side frames by fixing pieces.

7. The removable hard disk housing assembly as claimed in claim 1, wherein the rotatable handle has a handgrip and an axial portion integrally formed with the handgrip, and the supporting piece is positioned behind the rotatable handle.

8. The removable hard disk housing assembly as claimed in claim 1, wherein the supporting piece is fixed at the rotatable handle by a fixing piece.

9. The removable hard disk housing assembly as claimed in claim 1, wherein the supporting piece has two extension portions, and the two plate-liked elements correspond with the two extension portions of the supporting piece.

10. The removable hard disk housing assembly as claimed in claim 1, wherein the two plate-liked elements respectively have two guide slots, and each plate-liked element is positioned at the housing substrate because two fixing pieces are threaded through the two guide slots.

11. The removable hard disk housing assembly as claimed in claim 1, wherein each of the plate-liked elements has a push portion and an extension portion and the push portion corresponds with an extension portion of each of the supporting pieces, and the extension portions of the plate-liked elements are adapted to be protruded or retracted and correspond with two holes of the computer case.

* * * * *